(12) United States Patent
O'Brien, Jr.

(10) Patent No.: US 7,269,538 B1
(45) Date of Patent: Sep. 11, 2007

(54) METHOD FOR SPARSE DATA TWO-STAGE STOCHASTIC MENSURATION

(75) Inventor: Francis J. O'Brien, Jr., Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 420 days.

(21) Appl. No.: 10/863,839

(22) Filed: Jun. 1, 2004

(51) Int. Cl.
*G06F 17/50* (2006.01)
*G01S 7/00* (2006.01)
*G01S 7/52* (2006.01)

(52) U.S. Cl. .............................. 703/2; 702/143; 434/6
(58) Field of Classification Search .................... 703/2; 702/143; 434/6
See application file for complete search history.

(56) References Cited

U.S. PATENT DOCUMENTS

| | | | |
|---|---|---|---|
| 5,506,817 A | 4/1996 | O'Brien, Jr. | |
| 6,068,659 A | 5/2000 | O'Brien, Jr. | |
| 6,397,234 B1 | 5/2002 | O'Brien, Jr. | |
| 6,466,516 B1 | 10/2002 | O'Brien, Jr. | |
| 6,597,634 B2 | 7/2003 | O'Brien, Jr. | |
| 7,103,502 B1 * | 9/2006 | O'Brien, Jr. ................ | 702/181 |

* cited by examiner

*Primary Examiner*—Hugh Jones
(74) *Attorney, Agent, or Firm*—James M. Kasischke; Jean-Paul A. Nasser; Michael P. Stanley

(57) ABSTRACT

A method is provided for characterizing sparse data as either signal or noise. In one embodiment, a two-dimensional area which contains a distribution of data points of the sparse data from a selected time period is divided into equal size cells wherein each cell has an expectation of containing at least one data sample. Based on the expected proportion of a plurality cells which will be nonempty in a random distribution, a Poisson distribution or a Binomial distribution is utilized to determine a data sample mean. A probability of a false signal is determined from the number of cells utilized. A probability is also computed from the sample mean and compared to the probability of a false signal to determine whether to characterize the sparse data as signal or noise.

11 Claims, 5 Drawing Sheets

BINOMIAL TABLE FOR $k=24$, $\Theta=.713$, $\alpha=.01$

| m | $P(M=m)=(k/m)\Theta^m(1-\Theta)^{k-m}$ | $P(M\leq m)=\sum_0^m P(M=m)$ (CUMULATIVE) | $P(M\geq m)$ |
|---|---|---|---|
| 0 | 0 | 0 | |
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| 7 | 0 | 0 | |
| 8 | .0001 | .0001 | |
| 9 | .0005 | .0006 | |
| 10 | .0017 | .0023 $(m_1)$, $P(M\leq m)\leq\alpha_0$ | |
| 11 | .0053 | .0076 | |
| 12 | .0144 | .0220 | |
| 13 | .0334 | .0551 | |
| 14–20 | DATA NOT SHOWN FOR m=14 to 20 | | |
| 21 | .0397 | .9833 | .0564 |
| 22 | .0135 | .9968 | .0167 |
| 23 | .0029 | .9997 $(m_2)$, $P(M\geq m)\leq\alpha_0/2$ | .0032 |
| m=k=24 | .0003 | 1.0000 | .0003 |

FIG. 5

METHOD FOR SPARSE DATA TWO-STAGE STOCHASTIC MENSURATION

STATEMENT OF GOVERNMENT INTEREST

The invention described herein may be manufactured and used by or for the Government of the United States of America for Governmental purposes without the payment of any royalties thereon or therefore.

CROSS REFERENCE TO RELATED PATENT APPLICATIONS

The present application is related to the following inventions: patent of F. J. O'Brien, Jr. entitled "Detection of Randomness in Sparse Data Set of Three Dimensional Time Series Distributions," U.S. Pat. No. 6,980,926, filed 6 Oct. 2003 patent of F. J. O'Brien, Jr. entitled "Enhanced System for Detection of Randomness in Sparse Time Series Distributions," U.S. Pat. No. 7,103,502, filed 3 Mar. 2004; patent of F. J. O'Brien, Jr. and Chung T. Nguyen entitled "Method for Classifying a Random Process for Data Sets in Arbitrary Dimensions," U.S. Pat. No. 6,967,899, filed on even date with the present application ; application of F. J. O'Brien, Jr. entitled "Method for Detecting a Spatial Random Process Using Planar Convex Polygon Envelope," U.S. patent application Ser. No. 10/863,840, filed on even date with the present application; and patent of F. J. O'Brien, Jr. entitled "Multi-Stage Planar Stochastic Mensuration," U.S. Pat. No. 6,983,222, filed on even date with the present invention.

BACKGROUND OF THE INVENTION

(1) Field of the Invention

The invention generally relates to signal processing/data processing systems for processing time series distributions containing a small number of data points (e.g., less than about ten (10) to twenty-five (25) data points). More particularly, the invention relates to a method and apparatus for classifying the white noise degree (randomness) of a selected signal structure comprising a time series distribution composed of a highly sparse data set. As used herein, the term "random" (or "randomness") is defined in terms of a "random process" as measured by a selected probability distribution model. Thus, pure randomness, pragmatically speaking, is herein considered to be a time series distribution for which no function, mapping or relation can be constituted that provides meaningful insight into the underlying structure of the distribution, but which at the same time is not chaos.

(2) Description of the Prior Art

Recent research has revealed a critical need for highly sparse data set time distribution analysis methods and apparatus separate and apart from those adapted for treating large sample distributions. This is particularly the case in applications such as naval sonar systems which require that input time series signal distributions be classified according to their structure, i.e., periodic, transient, random or chaotic. It is well known that large sample methods often fail when applied to small sample distributions, but that the same is not necessarily true for small sample methods applied to large data sets. As a typical example, it is extremely valuable for a sonar operator to have tools with significant accuracy in distinguishing between random noise and the signal produced by a contact of interest.

Very small data set distributions may be defined as those with less than about ten (10) to twenty-five (25) measurement (data) points. Such data sets can be analyzed mathematically with certain nonparametric discrete probability distributions, as opposed to large-sample methods which normally employ continuous probability distributions (such as the Gaussian).

The probability theory discussed herein and utilized by the present invention is well known. It may be found, for example, in works such as P. J. Hoel et al., *Introduction to the Theory of Probability*, Houghton-Mifflin, Boston, MA, 1971, which is hereby incorporated herein by reference.

Also, as will appear more fully below, it has been found to be important to treat white noise signals themselves as the time series signal distribution to be analyzed, and to identify the characteristics of that distribution separately. This aids in the detection and appropriate processing of received signals in numerous data acquisition contexts, not the least of which include naval sonar applications. Accordingly, it will be understood that prior analysis methods and apparatus analyze received time series data distributions from the point of view of attempting to find patterns or some other type of correlated data therein. Once such a pattern or correlation is located, the remainder of the distribution is simply discarded as being noise. It is believed that the present invention will be useful in enhancing the sensitivity of present analysis methods, as well as being useful on its own.

Various aspects related to the present invention are discussed in the following exemplary patents:

U.S. Pat. No. 6,068,659, issued May 30, 2000, to Francis J. O'Brien, Jr., discloses a method for measuring and recording the relative degree of pical density, congestion, or crowding of objects dispersed in a three-dimensional space. A Population Density Index is obtained for the actual conditions of the objects within the space as determined from measurements taken of the objects. The Population Density Index is compared with values considered as minimum and maximum bounds, respectively, for the Population Density Index values. The objects within the space are then repositioned to optimize the Population Density Index, thus optimizing the layout of objects within the space.

U.S. Pat. No. 5,506,817, issued Apr. 9, 1996, to Francis J. O'Brien, Jr., discloses an adaptive statistical filter system for receiving a data stream comprising a series of data values from a sensor associated with successive points in time. Each data value includes a data component representative of the motion of a target and a noise component, with the noise components of data values associated with proximate points in time being correlated. The adaptive statistical filter system includes a prewhitener, a plurality of statistical filters of different orders, stochastic decorrelator and a selector. The prewhitener generates a corrected data stream comprising corrected data values, each including a data component and a time-correlated noise component. The plural statistical filters receive the corrected data stream and generate coefficient values to fit the corrected data stream to a polynomial of corresponding order and fit values representative of the degree of fit of corrected data stream to the polynomial. The stochastic decorrelator uses a spatial Poisson process statistical significance test to determine whether the fit values are correlated. If the test indicates the fit values are not randomly distributed, it generates decorrelated fit values using an autoregressive moving average methodology which assesses the noise components of the statistical filter. The selector receives the decorrelated fit values and coefficient values from the plural statistical filters and selects coefficient values from one of the filters in response to the decorrelated fit values. The coefficient values are coupled to a target motion analysis module which determines position and velocity of a target.

U.S. Pat. No. 6,466,516 B1, issued Oct. 15, 2002, to O'Brien, Jr. et al., discloses a method and apparatus for automatically characterizing the spatial arrangement among the data points of a three-dimensional time series distribution in a data processing system wherein the classification of said time series distribution is required. The method and apparatus utilize grids in Cartesian coordinates to determine (1) the number of cubes in the grids containing at least one input data point of the time series distribution; (2) the expected number of cubes which would contain at least one data point in a random distribution in said grids; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom within what probability, prior to its output from the invention to the remainder of the data processing system for further analysis.

U.S. Pat. No. 6,397,234 B1, issued May 28, 2002, to O'Brien, Jr. et. al., discloses a method and apparatus for automatically characterizing the spatial arrangement among the data points of a time series distribution in a data processing system wherein the classification of said time series distribution is required. The method and apparatus utilize a grid in Cartesian coordinates to determine (1) the number of cells in the grid containing at least-one input data point of the time series distribution; (2) the expected number of cells which would contain at least one data point in a random distribution in said grid; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom.

U.S. Pat. No. 6,597,634 B1, issued Jul. 22, 2003, to O'Brien, Jr. et al., discloses a signal processing system to processes a digital signal converted from to an analog signal, which includes a noise component and possibly also an information component comprising small samples representing four mutually orthogonal items of measurement information representable as a sample point in a symbolic Cartesian four-dimensional spatial reference system. An information processing sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The information processing system is illustrated as combat control equipment for undersea warfare, which utilizes a sonar signal produced by a towed linear transducer array, and whose mode operation employs four mutually orthogonal items of measurement information.

The above described references do not show a multi-stage process that may be utilized to select between the most accurate distribution for computing a probability for comparison with a false alarm probability in order to classify sparse data as noise or signal.

SUMMARY OF THE INVENTION

It is an object of the present invention to provide an improved method for analyzing sparse data.

It is another object of the present invention to classify sparse data as signal or noise.

It is yet another object of the invention to provide a method and apparatus including an automated measurement of the spatial arrangement among a very small number of points, object, measurements or the like whereby an ascertainment of the noise degree (i.e., randomness) of the time series distribution may be made.

It is yet another object of the invention to provide a method and apparatus useful in naval sonar systems which require acquired signal distributions to be classified according to their structure (i.e., periodic, transient, random, or chaotic) in the processing and use of those acquired signal distributions as indications of how and from where they were originally generated.

Further, it is an object of the invention to provide a method and apparatus capable of labeling a time series distribution with (1) an indication as to whether or not it is random in structure, and (2) an indication as to whether or not it is random within a probability of false alarm of a specific randomness calculation.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention comprises a method for characterizing sparse data as signal or noise which is preferably utilized in conjunction with other techniques discussed in the related patent applications referenced hereinbefore. The method may comprise one or more method steps such as, for example only, creating a virtual window having a two-dimensional area containing a distribution of data points of the sparse data for a selected time period and/or subdividing substantially the entirety of the area of the virtual window into a plurality k of cells wherein each of the plurality k of cells have the same polygonal shape and define the same area value.

Additional steps may comprise determining a quantity $\Theta$ wherein $\Theta$ represents an expected proportion of the plurality k of cells which will be nonempty in a random distribution. When $\Theta$ is less than a pre-selected value, then the method may comprise utilizing a Poisson distribution to determine a first mean of the data points. When $\Theta$ is greater than the pre-selected value, then the method may comprise utilizing a binomial distribution to determine a second mean of the data points.

The method may further comprise computing a probability p from the first mean or the second mean, depending on whether $\Theta$ is greater than or less than the pre-selected value. Other steps may comprise determining a false alarm probability $\alpha$ based on a total number of the plurality of k cells.

By comparing p with $\alpha$, the method may be utilized to then determine whether to characterize the sparse data as noise or signal.

In one embodiment, the distribution of the sparse data from the selected time period comprises less than about twenty-five (25) data points.

In one example, the method the pre-selected amount discussed above is equal to 0.10 such that if $\Theta \leq 0.10$, then the Poisson distribution is utilized, and if $\Theta > 0.10$, then the binomial distribution is utilized.

In one presently preferred embodiment, the step of determining a probability of false alarm rate α comprises setting the alarm rate α equal to 0.01 when the total number of the plurality of k cells is greater than 25, and/or determining a probability of false alarm rate α comprises setting the alarm rate α equal to 0.05 when the total number of the plurality of k of cells is greater than or equal to 5 and less than or equal to 25 and/or determining a probability of false alarm rate α comprises setting the alarm rate α equal to 0.10 when the total number of the plurality of k cells is less than 5.

The above and other novel features and advantages of the invention, including various novel details of construction and combination of parts will now be more particularly described with reference to the accompanying drawings and pointed out by the claims. It will be understood that the particular device and method embodying the invention is shown and described herein by way of illustration only and not as limitations on the invention. The principles and features of the invention may be employed in numerous embodiments without departing from the scope of the invention in its broadest aspects.

BRIEF DESCRIPTION OF THE DRAWINGS

Reference is made to the accompanying drawings in which is shown an illustrative embodiment of the apparatus and method of the invention, from which its novel features and advantages will be apparent to those skilled in the art, and wherein:

FIG. 5 is a table showing an illustrative set of discrete binomial probabilities for the randomness of each possible number of occupied cells of a particular time series distribution within a specific probability of false alarm rate of the expected randomness number.

DESCRIPTION OF THE PREFERRED EMBODIMENT

Figure 1:
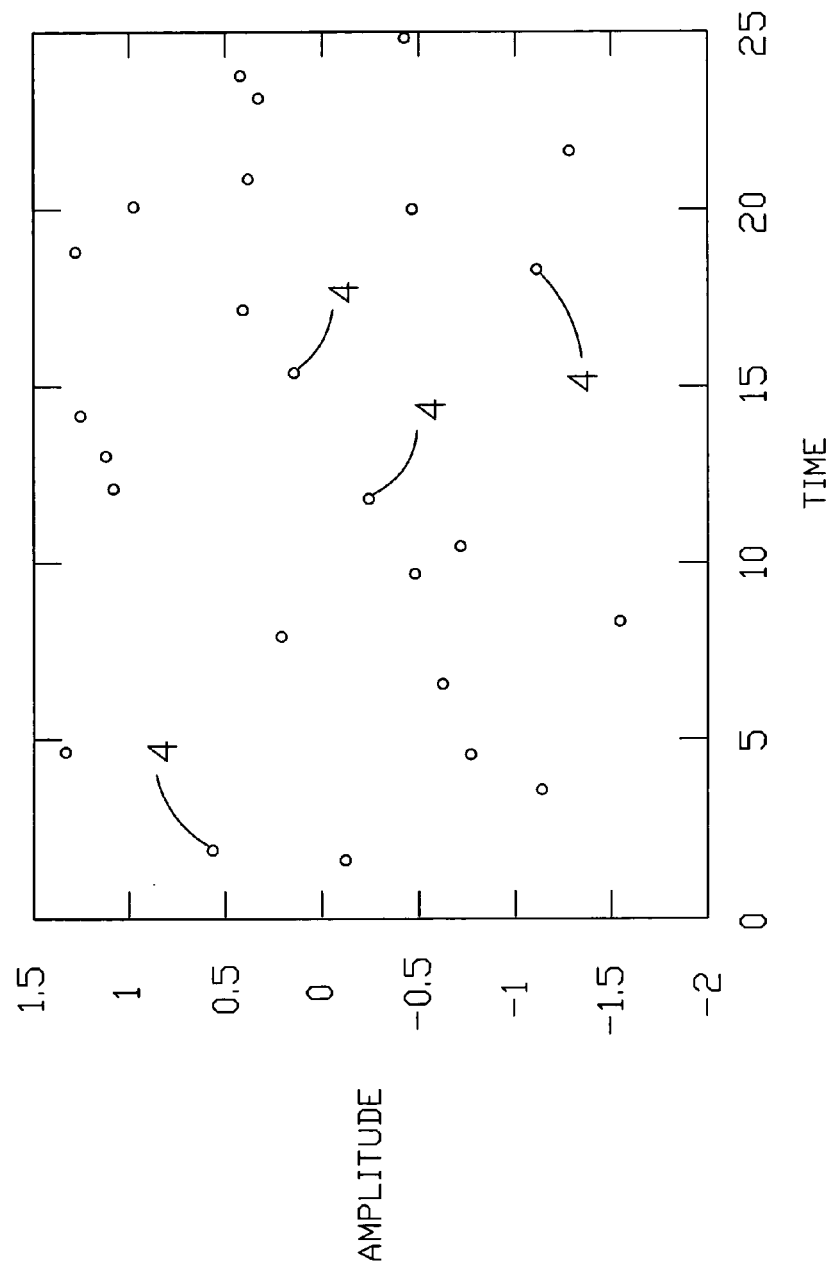
FIG. 1 is a hypothetical depiction in Cartesian coordinates of a representative white noise (random) time series signal distribution.

Referring now to the drawings, a preferred embodiment of the method and apparatus of the invention will be presented first from a theoretical perspective, and thereafter, in terms of a specific example. In this regard, it is to be understood that all data points are herein assumed to be expressed and operated upon by the various apparatus components in a Cartesian coordinate system. Accordingly, all measurement, signal and other data input existing in terms of other coordinate systems is assumed to have been re-expressed in a Cartesian coordinate system prior to its input into the inventive apparatus or the application of the inventive method thereto.

The invention starts from the preset capability of a display/operating system 8 (FIG. 4) to accommodate a set number of data points N in a given time interval ≅t. The value (amplitude) of each data point in each time series distribution falls within limits which may be expressed as ≅Y= max (Y) − min (Y). A representation of a time series distribution of random sonar input data points 4 is shown in FIG. 1. A subset of this overall time series data distribution would normally be selected for analysis of its signal component distribution by this invention.

For purposes of mathematical analysis of the signal components, it is assumed that the product/quantity given by ≅t * ΔY = [max(t) −min(t)] * [max(Y) − min(Y)] will define the window "geometric area" with respect to the quantities in the analysis subsystem. The sides of the ≅t * ΔY window are drawn parallel to the time axis and amplitude axis, respectively, although other window shapes may be employed (such as a convex polygon) without departure from the invention in its broadest aspects. Then, for substantially the total area of the display region, a Cartesian partition is superimposed on the region with each partition being a small square of side δ (see, FIG. 2). The measure of δ will be defined herein as:

$$\delta = (\Delta t * \Delta Y/k)^{1/2} \quad (1)$$

The quantity k represents the total number of small squares each of area $\delta^2$ created in the area ≅t * ΔY. Incomplete squares 6 are ignored in the analysis. The quantity of such squares which it is desired to occupy with at least one data point from an input time series distribution is determined using the following relationship wherein N is the maximum number of data points in the time series distribution, ≅t and ΔY are the Cartesian axis lengths, and the side lengths of each of the squares is δ:

$$K_I = \text{int}(\Delta t/\delta_I) * \text{int}(\Delta Y/\delta_I) \quad (2)$$

where int is the integer operator, $$\delta_I = \sqrt{[(\Delta t * \Delta Y)/k_o]}, \text{ and}$$

$$k_0 = k_1 \text{ if } |N - k_1| \leq |N - k_2| \text{ or}$$

$$k_2 \text{ otherwise}$$

where $$k_1 = [\text{int}(N^{1/2})]^2$$

$$K_2 = [\text{int}(N^{1/2}) + 1]^2$$

$$k_{II} = \text{int}(\Delta t/\delta_{II}) * \text{int}(\Delta Y/\delta_{II})$$

where $$\delta_{II} = \sqrt{[(\Delta t * \Delta Y)/N]}$$

$$\therefore k = k_I \text{ if } K_I > K_{II}$$

$$k = k_{II} \text{ if } K_I < K_{II}$$

$$k = \max(k_I, k_{II}) \text{ if } k_I = k_{II}$$

where $$K_I = \delta_I^2 k_I/(\Delta t \cdot \Delta Y) \leq 1 \text{ and}$$

$$K_{II} = \delta_{II}^2 k_{II}/(\Delta t \cdot \Delta Y) \leq 1$$

In cases with very small amplitudes, it may occur that int(ΔY/$\delta_I$) ≤1 or int(ΔY/$\delta_{II}$)≤1. In such cases, the solution is to round off either quantity to the next highest value (i.e., ≥2). This weakens the theoretical approach, but it allows for practical measurements to be made.

Thus, for example, if $\Delta t$ (or N)=30, and $\Delta Y$=20, then k=24 and $\delta$=5.0. Accordingly, $k*\delta^2 = 24*25 = 600 \cong t*\Delta Y$. In essence, therefore, the above relation defining the value k selects the number of squares of length $\delta$ and area $\delta^2$ which fill up the total space $\cong t*\Delta Y$ to the greatest extent possible (i.e., ideally $k*\delta^2 \cong t*\Delta Y$).

From the selected partitioning parameter k, the region (area) $\cong t*\Delta Y$ is carved up into k squares with the length of each square being $\delta$ as defined above. In other words, the horizontal (or time) axis is marked off into intervals, exactly int($\Delta t/\delta$) of them, so that the time axis has the following arithmetic sequence of cuts (assuming that the time clock starts at $\Delta t$=0):

$$0, \delta, 2\delta, \ldots, \text{int}(\Delta t/\delta)*\delta \quad (3)$$

Likewise, the vertical (or measurement or amplitude) axis is cut up into intervals, exactly int($\Delta Y/\delta$) of them, so that the vertical axis has the following arithmetic sequence of cuts:

min(Y), min(Y) +$\delta$, . . . , min(Y) +int($\Delta Y/\delta$)* $\delta$=max(Y), where min is the minimum operator and $\delta$ is defined as above.

Based on the Poisson point process theory for a measurement set of data in a time interval $\Delta t$ of measurement magnitude $\Delta Y$, that data set is considered to be purely random (or "white noise") if the number of partitions k are nonempty (i.e., contain at least one data point of the time series distribution thereof under analysis) to a specified degree. The expected number of nonempty partitions in a random distribution is given by the relationship:

$$k*\Theta = k*(1-e^{-N/k}) \quad (4)$$

where the quantity $\Theta$ is the expected proportion of nonempty partitions in a random distribution and N/k is "the parameter of the spatial Poisson process" corresponding to the average number of points observed across all subspace partitions.

The boundary, above and below $k*\Theta$, attributable to random variation and controlled by a false alarm rate is the so-called "critical region" of the test. The quantity $\Theta$ not only represents (a) the expected proportion of nonempty partitions in a random distribution, but also (b) the probability that one or more of the k partitions is occupied by pure chance, as is well known to those in the art. The boundaries of the random process are determined in the following way.

Figure 2:
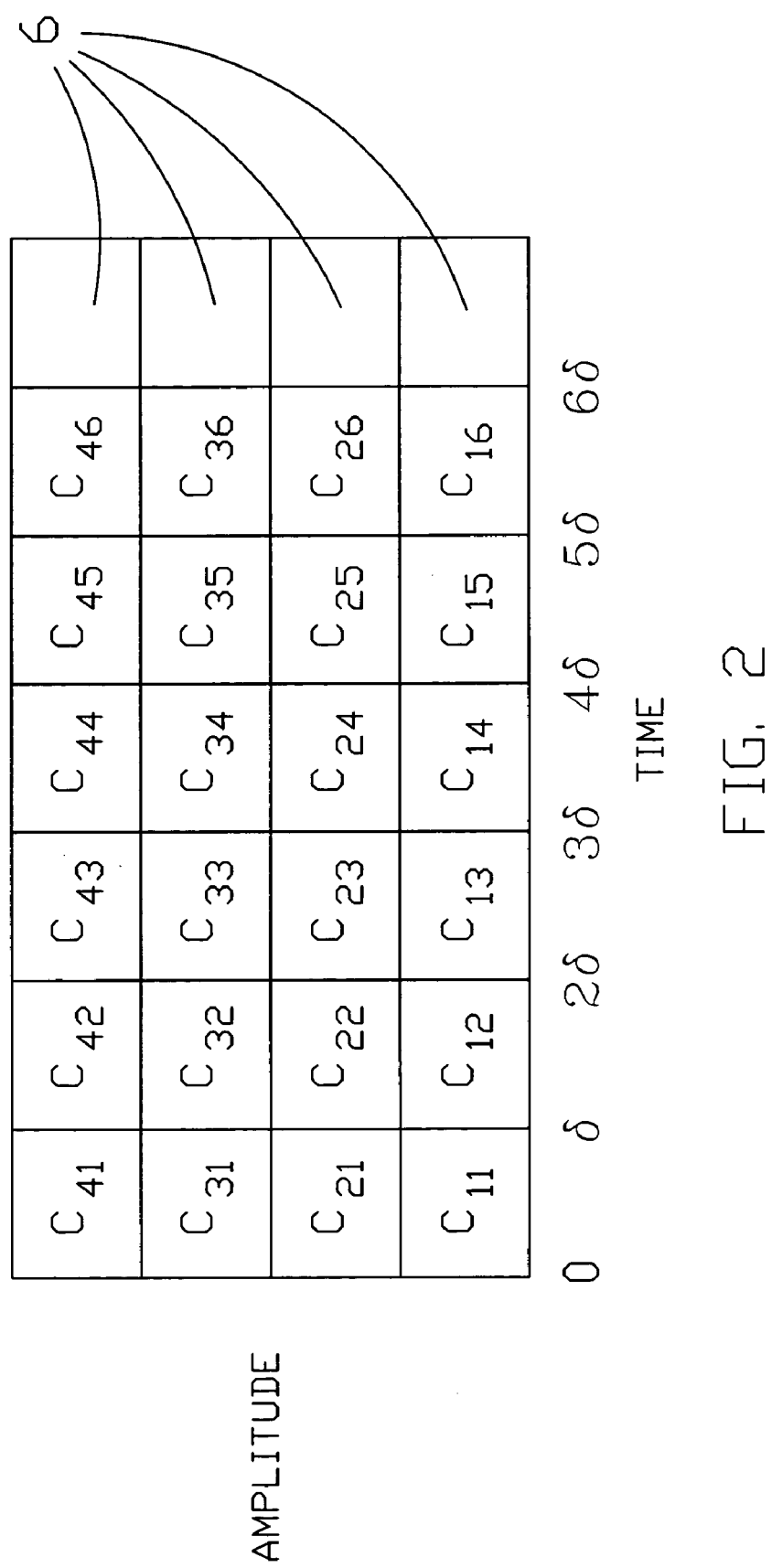
FIG. 2 is a hypothetical illustrative representation of a virtual window in accordance with the invention divided into a grid of square cells each having a side of length δ, and an area of $\delta^2$.

Let M be a random variable representing the integer number of occupied cells (partitions) as illustratively shown in FIG. 2. Let m be an integer (sample) representation of M. Let $m_1$ be the quantity forming the lower random boundary of the statistic $k*\Theta$ given by the binomial criterion:

$$P(M \leq m) \leq \alpha_0/2, \min(\alpha/2 - \alpha_0/2) \quad (5)$$

where $$P(M \leq m) = \Sigma B(m;k,\Theta) \text{ from } m=0 \text{ to } m=m_1, \text{ and}$$

k and $\Theta$ are defined as above.

B(m;k,$\Theta$) is the binomial probability function given as:

$$B(m;k,\Theta) = (k,m)(\Theta)^m(1-\Theta)^{k-m} \quad (6)$$

where (k,m) is the binomial coefficient, (k,m)=k!/m! (k−m)! and $\Sigma$ B(m;k,$\Theta$) from m=0 to m=k equals 1.0.

The quantity $\alpha_o$ is the probability of coming closest to an exact value of the pre-specified false alarm probability $\alpha$, and $m_1$ is the largest value of m such that $P(M \leq m) \leq \alpha_0/2$. It is an objective of this method to minimize the difference between $\alpha$ and $\alpha_0$. The recommended values of $\alpha$ (the probability false alarm rate) for differing values of spatial subsets k are as follows:

If k>25, the $\alpha$=0.01;

If $5 \leq k \leq 25$, then $\alpha$=0.05; and

If k<5, then $\alpha$=0.10 \quad (7)

The upper boundary of the random process is called $m_2$, and is determined in a manner similar to the determination of $m_1$.

Thus, let $m_2$ be the upper random boundary of the statistic $k*\Theta$ given by:

$$P(M \geq m) \leq \alpha_o/2, \min(\alpha/2 - \alpha_o/2) \quad (8)$$

where $$P(M \geq m) = \sum_{m=m_2}^{k} B(m;k,\Theta) \leq \alpha_o/2 \text{ or}$$

$$P(M \geq m) = 1 - \sum_{m=0}^{m_2} B(m;k,\Theta) \leq \alpha_o/2$$

$\alpha_o$ is the probability of coming closest to an exact value of the pre-specified false alarm probability $\alpha$, and $m_2$ is the largest value of m such that $P(M \geq m) \leq \alpha_o/2$. It is an objective of the invention to minimize the difference between $\alpha$ and $\alpha_0$.

Hence, the subsystem determines if the signal structure contains m points within the "critical region" warranting a determination of "random".

The subsystem also assesses the random process hypothesis by testing:

$$H_o: \overline{P} = \Theta(\text{Noise}) \quad (9)$$

$$H_1: \overline{P} \neq \Theta(\text{Signal+Noise})$$

Where $\overline{P}$=m/k is the sample proportion of signal points contained in the k subregion partitions expected to be occupied by a truly random (stochastic) spatial distribution. As noted above, FIG. 1 shows what a hypothetical white noise (random) distribution looks like in Cartesian time-space.

Thus, if $\Theta \approx \overline{P}$=m/k, the observed distribution conforms to a random distribution corresponding to "white noise".

The estimate for the proportion of k cells occupied by N measurements ($\overline{P}$) is developed in the following manner. Let each of the k cells of length $\delta$ be denoted by $C_{ij}$ and the number of objects observed in each $C_{ij}$ cell be denoted card ($C_{ij}$) where card means "cardinality" or subset count. $C_{ij}$ is labeled from left to right starting at the lower left-hand corner $C_{11}, C_{12}, \ldots, C_{46}$ (see FIG. 2).

Next to continue the example for k=24 shown in FIG. 2, define the following count quantity for the 6×4 partition comprising whole square subsets:

$X_{ij}$=1 if card ($C_{ij}$)>0; i=1 to 4, j=1 to 6

$X_{ij}$=0 if card ($C_{ij}$)=0; i=1 to 4, j=1 to 6 \quad (10)

where card is the cardinality or count operator. $X_{ij}$ is a dichotomous variable taking on the individual values of 1 if a cell $C_{ij}$ has one or more objects present, and a value of 0 if the box is empty.

Then calculate the proportion of 24 cells occupied in the partition region:

$$\overline{P} = 1/24 \Sigma\Sigma X_{ij} \quad (11)$$

where the sums are taken from j=1 to 6 and i=1 to 4, respectively.

The generalization of this example to any sized table is obvious, and within the scope of the present invention. For the general case, it will be appreciated that, for the statistics $X_{ij}$ and $C_{ij}$ the index j runs from 1 to int($\Delta t/\delta$) and the index i runs from 1 to int($\Delta Y/\delta$).

In addition, another measure useful in the interpretation of outcomes is the R ratio, defined as the ratio of observed to expected occupancy rates:

$$R = m/(k*\Theta) = \overline{P}/\Theta \quad (12)$$

A rigorous statistical procedure has been developed to determine whether the observed R-value is indicative of "noise" or "signal". The procedure renders quantitatively the interpretations of the R-value whereas the prior art has relied primarily on intuitive interpretation or ad hoc methods, which can be erroneous.

In this formulation, one of two statistical assessment tests is utilized depending on the value of the parameter $\Theta$.

If $\Theta \leq 0.10$, then a Poisson distribution is employed. To apply the Poisson test, the distribution of the N sample points is observed in the partitioned space. It will be appreciated that a data sweep across all cells within the space will detect some of the squares being empty, some containing k=1 points, k=2 points, k=3 points, and so on. The number of points in each k category is tabulated in a table such as follows:

| Frequency Table of Cell Counts | |
|---|---|
| k (number of cells with points) | $N_k$ (number of points in k cells) |
| 0 | $N_0$ |
| 1 | $N_1$ |
| 2 | $N_2$ |
| 3 | $N_3$ |
| . | . |
| . | . |
| . | . |
| K | $N_k$ |

From this frequency table, two statistics are of interests for the Central Limit Theorem approximation:

The "total", $$Y = \sum_{k=0}^{K} k N_k,$$

and (13)

the sample mean, $$\mu_0 = \frac{\sum_{k=0}^{K} k N_k}{\sum_{k=0}^{K} N_k}.$$

Then, if $\Theta \leq 0.10$, the following binary hypothesis is of interest:

$$H_0: \mu = \mu_0 \text{(NOISE)} \quad (14)$$

$$H_1: \mu \neq \mu_0 \text{(SIGNAL)}$$

The Poisson test statistic, derived from the Central Limit Theorem, Eq. (3) is as follows:

$$Z_p = \frac{Y - N\mu_0}{\sqrt{N\mu_0}}, (k > 25) \quad (15)$$

where $$Y = \sum_{k=0}^{K} k N_k,$$

and N is the sample size. Then $$\mu_0 = \frac{\sum_{k=0}^{K} k N_k}{\sum_{k=0}^{K} N_k}$$

is the sample mean and sample variance. (It is well known that $\mu = \sigma^2$ in a Poisson distributions).

The operator compares the value of $Z_p$ against a probability of False Alarm $\alpha$. $\alpha$ is the probability that the null hypothesis (NOISE) is rejected when the alternative (SIGNAL) is the truth.

The probability of the observed value $Z_p$ is calculated as:

$$p = P(|z_p| \leq Z) = 1 - \frac{1}{\sqrt{2\pi}} \int_{-|z_p|}^{+|z_p|} \exp(-.5x^2) dx \quad (16)$$

where |x| means "absolute value" as commonly used in mathematics.

The calculation of Eq. 6, as known to those skilled in the art, is performed in a standard finite series expansion.

On the other hand, if $\Theta > 0.10$, the invention dictates that the following binary hypothesis set prevail:

$$H_0: \mu = k\theta \text{(NOISE)} \quad (17)$$

$$H_1: \mu = k\theta \text{(SIGNAL)}$$

The following binomial test statistic is employed to test the hypothesis:

$$Z_B = \frac{m \pm c - k\theta}{\sqrt{k\theta(1-\theta)}} \quad (18)$$

where c=0.5 if $X < \mu$ (Yates Continuity correction factor used for discrete variables)

The quantities of $Z_B$ have been defined previously.

The probability of the observed value $Z_B$ is calculated as $$p = P(|z_B| \leq Z) = 1 - \frac{1}{\sqrt{2\pi}} \int_{-|z_B|}^{+|z_B|} \exp(-.5x^2) dx \qquad (19)$$

in a standard series expansion.

For either test statistic, $Z_p$ or $Z_B$, the following decision rule is used to compare the false alarm rate $\alpha$ with the observed probability of the statistic, p:

if $p \geq \alpha \Rightarrow$ NOISE

If $p < \alpha \Rightarrow$ SIGNAL

Thus, if the calculated probability value $p > \alpha$, then the three-dimensional spatial distribution is deemed "noise"; otherwise the X-Y-Z data is characterized as "signal" by the Rtest.

EXAMPLE

Figure 3:
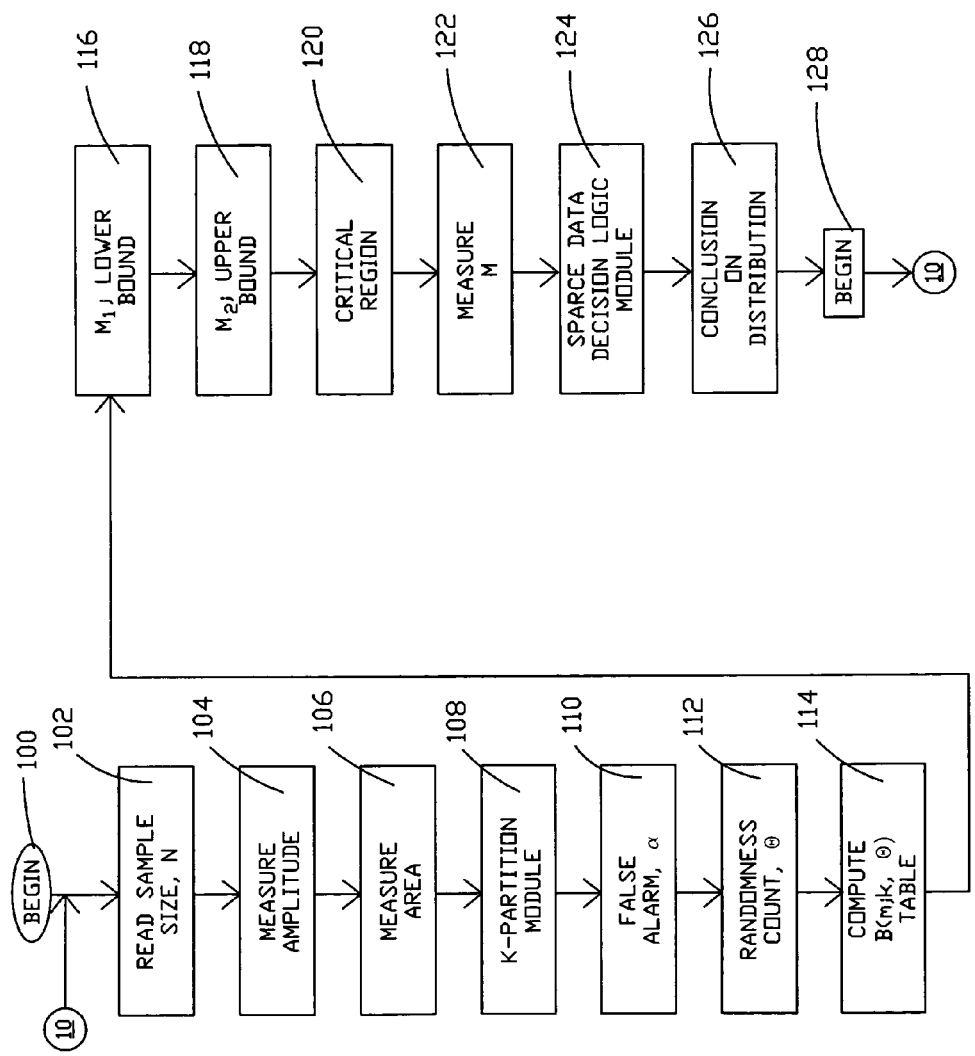
FIG. 3 is a block diagram representatively illustrating the method steps of the invention.
Figure 4:
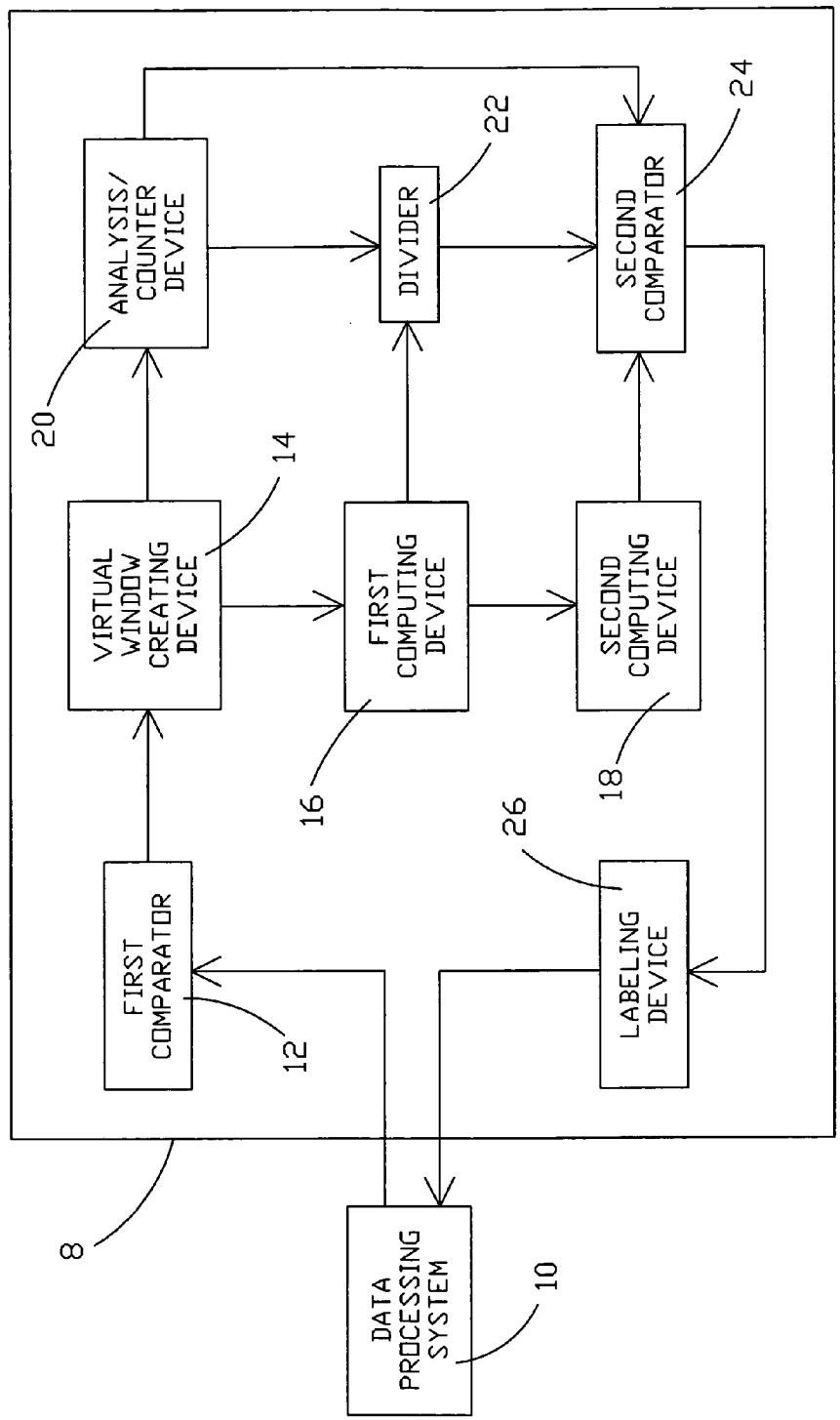
FIG. 4 is a block diagram representatively illustrating an apparatus in accordance with the invention.

Having thus explained the theory of the invention, an example thereof will now be presented for purposes of further illustration and understanding (see, FIGS. 3 and 4). A value for N is first selected, here N =30 (step 100, FIG. 3). A time series distribution of data points is then read into a display/operating subsystem 8 adapted to accommodate a data set of size N from data processing system 10 (step 102). Thereafter, the absolute value of the difference between the largest and the smallest data points $\Delta Y$ is determined by a first comparator device 12 (step 104). In this example, it will be assumed that N $=\Delta t=30$ measurements with a measured amplitude of $\Delta Y=20$ units. The N and $\Delta Y$ values are then used by window creating device 14 to create a virtual window in the display/operating system enclosing the input time series distribution, the size of the window so created being $\Delta t*\Delta y = 600$ (step 106).

Thereafter, as described above, the virtual window is divided by the window creating device 14 into a plurality k of cells $C_{ij}$ (see FIG. 4), each cell having the same geometric shape and enclosing an equal area so as to substantially fill the virtual window containing the input time series distribution set of data points (step 108). The value of k is established by the relation:

$$k = \text{int}(\Delta t/\delta) * \text{int}(\Delta Y/\delta) = 6*4 = 24 \qquad (20)$$

where $$\delta = \sqrt{(\Delta t * \Delta Y)/k} = 5.0$$

Thus, the 600 square unit space of the virtual window is partitioned into 24 cells of side 5.0 so that the whole space is filled ($k*\delta^2 = 600$). The time-axis arithmetic sequence of cuts are: 0, 5, . . . , $\text{int}(\Delta t/\delta)*\delta = 30$. The amplitude axis cuts are: min(Y), min(Y) +$\delta$, . . . , min(Y) +int($\Delta Y/\delta$)*$\delta$=max(Y).

Next, the probability false alarm rate is set at step 110 according to the value of k as discussed above. More particularly, in this case $\alpha=0.01$, and the probability of a false alarm within the critical region is $\alpha/2=0.005$.

The randomness count is then calculated by first computing device 16 at step 112 according to the relation $k*\Theta=k*(1-e^{-N/k})$ which in this example equals 0.713. Therefore, the number of cells expected to be nonempty in this example if the input time series distribution is random is about 17.

The binomial distribution discussed above is then calculated by a second computing device 18 according to the relationships discussed above (step 114, FIG. 3). Representative values for this distribution are shown in FIG. 5 for each number of possible occupied cells m.

The upper and lower randomness boundaries then are determined, also by second calculating device 18. Specifically, the lower boundary is calculated using $m_1$ from FIG. 5 (step 116). Then, computing the binomial probabilities results in P(M $\leq$10)=0.0025. Thus, the lower bound is $m_1=10$. FIG. 5 also shows the probabilities for $\Theta=0.713$, k=24.

The upper boundary, on the other hand, is the randomness boundary $m_2$ from the criterion P(M>m) $\leq \alpha_o/2$. Computing the binomial probabilities gives P(M >23) =0.0032; hence $m_2 =23$ is taken as the upper bound (step 118). The probabilities necessary for this calculation also are shown in FIG. 5.

Therefore, the critical region is defined in this example as $m_1 \leq 10$, and $m_2 \geq 23$ (step 120).

The actual number of cells containing one or more data points of the time series distribution determined by analysis/counter device 20 (step 122, FIG. 3) is then used by divider 22 and a second comparator 24 in the determination of the randomness of the distribution (step 124, FIG. 3). Specifically, using m=16 as an example, it will be seen that $\overline{P}=m/k=0.667$, and that $R=\overline{P}/\Theta=0.667/0.713=0.93$.

Branching to step 124 (FIG. 3) which the sparse data decision logic module performs, the R statistic value of 0.93 is evaluated statistically. A more precise indicator is obtained by applying the significance test in accord with the present invention, as described earlier. For this calculation, we note that $\theta=0.713$, which invokes the Binomial probability model to test the hypothesis:

$H_0: \mu = k\theta$(NOISE) (tm 21)

$H_1: \mu = k\theta$(SIGNAL)

In this case, $k\theta=17.11$. Thus, applying the Binomial test gives:

$$Z_B = \frac{m \pm c - k\theta}{\sqrt{k\theta(1-\theta)}} = \frac{16 - .5 - 17.11}{\sqrt{24(.713)(1-.713)}} \approx -.33 \qquad (22)$$

The p value is computed to be:

$$p = P(|z_B| \leq Z) = 1 - \frac{1}{\sqrt{2\pi}} \int_{-|-.33|}^{+|-.33|} \exp(-.5x^2) dx = .74 \qquad (23)$$

Since p=0.74 and $\alpha=0.1$, and since $p \geq \alpha$, we conclude that the R test shows the volumetric data to be random (NOISE only, with 99% certainty) with the value of R=0.93 computed for this spatial distribution in 32-space.

It is also worth noting in this regard that the total probability is 0.0023+0.0032=0.0055, which is the probability of being wrong in deciding "random". This value is less than the probability of a false alarm. Thus, the actual protection against an incorrect decision is much higher (by about 45%) than the a priori sampling plan specified.

Since m=16 falls inside of the critical region, i.e., $m_1 \leq 16 \leq m_2$, the decision is that the data represent an essentially white noise distribution (step 126). Accordingly, the distribution is labeled at step 128 by the labeling device 26 as a noise distribution, and transferred back to the data processing system 10 for further processing. In the naval sonar situation, a signal distribution labeled as white noise would be discarded by the processing system, but in some situations a further analysis of the white noise nature of the distribution would be possible. Similarly, the invention is contemplated to be useful as an improvement on systems which look for patterns and correlations among data points. For example, overlapping time series distributions might be analyzed in order to determine where a meaningful signal begins and ends.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A data processing method for characterizing sparse data received in a computer from a sonar system as signal or noise, said method comprising the steps of:
   creating a virtual window having a two-dimensional area containing a distribution of data points of said sparse data for a selected time period;
   subdividing the entirety of said area of said virtual window into a plurality k of cells wherein said plurality k of cells have an identical polygonal shape and each cell defines an identical area;
   determining a quantity $\Theta$ wherein $\Theta$ represents an expected proportion of said plurality k of cells which will be nonempty in a random distribution calculated using the following relation:

$k*\Theta = k*(1-e^{-N/k})$ wherein N is the number of data points in the distribution of data points;
   when $\Theta$ is less than a pre-selected value, then utilizing a Poisson distribution to determine a first mean of said data points;
   when $\Theta$ is greater than said pre-selected value, then utilizing a binomial distribution to determine a second mean of said data points;
   computing a probability p from said first mean or said second mean depending on whether $\Theta$ is greater than or less than said pre-selected value;
   determining a false alarm probability $\alpha$ based on a total number of said plurality of k cells;
   comparing p with $\alpha$ to determine whether to characterize said sparse data as noise or signal, wherein:
   if $p \geq \alpha =>$ sparse data is characterized as NOISE;
   if $p < \alpha =>$ sparse data is characterized as SIGNAL; and
   labeling said sparse data in accordance with said characterization made in said step of comparing for further processing in the computer.

2. A method according to claim 1 wherein said distribution of said sparse data from said selected time period comprises less than twenty-five (25) data points.

3. A method according to claim 1, wherein the total number of said data points in the virtual window is given by $$Y = \sum_{k=0}^{K} kN_k.$$

4. A method according to claim 1 wherein said pre-selected value is equal to 0.10 such that if $\Theta \leq 0.10$, then said Poisson distribution is utilized, and if $\Theta > 0.10$, then said binomial distribution is utilized.

5. A method according to claim 1, wherein said step of determining a false alarm probability $\alpha$ comprises setting said false alarm probability $\alpha$ equal to 0.01 when said total number of said plurality of k cells is greater than 25.

6. A method according to claim 5, wherein said step of determining a false alarm probability $\alpha$ comprises setting said false alarm probability $\alpha$ equal to 0.05 when said total number of said plurality of k of cells is greater than or equal to 5 and less than or equal to 25.

7. A method according to claim 6, wherein said step of determining a false alarm probability $\alpha$ comprises setting said false alarm probability $\alpha$ equal to 0.10 when the total number of said plurality of k cells is less than 5.

8. A method according to claim 1, wherein said step of computing a probability p from said first mean further comprises utilizing the following equation:

$$p = P(|z_p| \leq Z) = 1 - \frac{1}{\sqrt{2\pi}} \int_{-|z_p|}^{+|z_p|} \exp(-.5x^2)\, dx \text{ where}$$

$$z_p = \frac{Y - N\mu_0}{\sqrt{N\mu_0}},$$

where N is the sample size, Y is the total number of data points in the virtual window, and $$\mu_0 = \frac{\sum_{k=0}^{K} kN_k}{\sum_{k=0}^{K} N_k}$$

is said first mean.

9. A method according to claim 1, wherein said step of computing a probability p from said second mean further comprises utilizing the following equation:

$$p = P(|z_B| \leq Z) = 1 - \frac{1}{\sqrt{2\pi}} \int_{-|z_B|}^{+|z_B|} \exp(-.5x^2)\, dx \text{ where}$$

$$Z_B = \frac{m \pm c - k\Theta}{\sqrt{k\Theta(1-\Theta)}}, \text{ and}$$

where m is the number of said plurality k of cells which are occupied in a sample, and c is a constant.

10. A method according to claim 1, further comprising calculating the ratio of observed to expected cell occupancy rates according to the relation:

$R = m/(k*\Theta)$ wherein m is where m is the number of said plurality k of cells which are occupied in a sample.

11. A data processing method for alerting a sonar operator to the presence of a signal comprising the steps of:
   receiving sparse data in a computer from a sensor;
   creating a virtual window having a two-dimensional area containing a distribution of data points of said sparse data for a selected time period;
   subdividing the entirety of said area of said virtual window into a plurality k of cells wherein said plurality k of cells have an identical polygonal shape and each cell defines an identical area;

determining a quantity Θ wherein Θ represents an expected proportion of said plurality k of cells which will be nonempty in a random distribution calculated using the following relation:

$$k*\Theta k*(1-e^{-N/k})$$

wherein N is the number of data points in the distribution of data points;
   when Θ is less than a pre-selected value, then utilizing a Poisson distribution to determine a first mean of said data points;
   when Θ is greater than said pre-selected value, then utilizing a binomial distribution to determine a second mean of said data points;

computing a probability p from said first mean or said second mean depending on whether Θ is greater than or less than said pre-selected value;
determining a false alarm probability α based on a total number of said plurality of k cells;
comparing p with α to determine whether to characterize said sparse data as noise or signal, wherein:
   if $p \geq \alpha$ => sparse data is characterized as NOISE;
   if $p < \alpha$ => sparse data is characterized as SIGNAL; and
alerting the operator if said sparse data is characterized as signal.

* * * * *